(12) United States Patent
Aotani et al.

(10) Patent No.: US 10,573,875 B2
(45) Date of Patent: Feb. 25, 2020

(54) CATHODE FOR LITHIUM ION SECONDARY BATTERY AND LITHIUM ION SECONDARY BATTERY USING THE SAME

(71) Applicant: HITACHI CHEMICAL COMPANY, LTD., Tokyo (JP)

(72) Inventors: Masashi Aotani, Fukaya (JP); Hiroki Kuzuoka, Tokyo (JP)

(73) Assignee: HITACHI CHEMICAL COMPANY, LTD., Tokyo (JP)

( * ) Notice: Subject to any disclaimer, the term of this patent is extended or adjusted under 35 U.S.C. 154(b) by 40 days.

(21) Appl. No.: 15/025,470

(22) PCT Filed: Sep. 26, 2014

(86) PCT No.: PCT/JP2014/075732
§ 371 (c)(1),
(2) Date: Mar. 28, 2016

(87) PCT Pub. No.: WO2015/046469
PCT Pub. Date: Apr. 2, 2015

(65) Prior Publication Data
US 2016/0240836 A1    Aug. 18, 2016

(30) Foreign Application Priority Data

Sep. 30, 2013  (JP) ................. 2013-205516

(51) Int. Cl.
*H01M 4/62* (2006.01)
*H01M 2/34* (2006.01)
(Continued)

(52) U.S. Cl.
CPC ............. *H01M 2/348* (2013.01); *H01M 4/13* (2013.01); *H01M 4/667* (2013.01);
(Continued)

(58) Field of Classification Search
CPC ........ H01M 2/348; H01M 4/13; H01M 4/667; H01M 2004/028; H01M 2220/30; H01M 10/0525; H01M 2200/106
See application file for complete search history.

(56) References Cited

U.S. PATENT DOCUMENTS

| 2002/0114993 | A1* | 8/2002 | Miyaki | H01M 4/131 429/137 |
| 2003/0091892 | A1 | 5/2003 | Watanabe et al. | |
| 2015/0280241 | A1* | 10/2015 | Hara | H01G 11/66 429/233 |

FOREIGN PATENT DOCUMENTS

| CN | 1406401 A | 3/2003 |
| JP | H10-50294 A | 2/1998 |

(Continued)

OTHER PUBLICATIONS

Machine translation of JP 2009-176599, retrieved from <https://www.j-platpat.inpit.go.jp/web/all/top/BTmTopEnglishPage> on Jul. 11, 2017.*

(Continued)

*Primary Examiner* — Cynthia K Walls
(74) *Attorney, Agent, or Firm* — Fitch, Even, Tabin & Flannery, LLP (57) ABSTRACT

A cathode for a lithium ion secondary battery, including: a cathode current collector; a PTC layer including an electrically conductive particle, a polymer particle, and a water-soluble polymer, the PTC layer being provided on the cathode current collector; and a cathode active material layer provided on the PTC layer, as well as a lithium ion secondary battery using the same.

13 Claims, 3 Drawing Sheets

(51) Int. Cl.
  *H01M 4/66*   (2006.01)
  *H01M 4/13*   (2010.01)
  *H01M 10/0525*    (2010.01)
  *H01M 4/02*       (2006.01)

(52) U.S. Cl.
  CPC .. *H01M 10/0525* (2013.01); *H01M 2004/028* (2013.01); *H01M 2200/106* (2013.01); *H01M 2220/30* (2013.01)

(56) References Cited

FOREIGN PATENT DOCUMENTS

| | | | |
|---|---|---|---|
| JP | 2002-526897 A | 8/2002 |
| JP | 2009-176599 A | 8/2009 |
| KR | 10-2002-0077445 A | 10/2002 |
| WO | 2002/054524 A1 | 7/2002 |

OTHER PUBLICATIONS

International Search Report for PCT/JP2014/075732 dated Dec. 9, 2014; English translation submitted herewith (5 Pages).
Office Action of CN Patent Application No. 2014800536591 dated Apr. 24, 2017 with partial English translation.
Office Action of KR Appln. No. 10-2016-7010816 dated May 31, 2017 with partial English translation.

\* cited by examiner

CATHODE FOR LITHIUM ION SECONDARY BATTERY AND LITHIUM ION SECONDARY BATTERY USING THE SAME

CROSS-REFERENCE TO RELATED APPLICATIONS

This application is a U.S. national phase application filed under 35 U.S.C. § 371 of International Application No. PCT/JP2014/075732, filed Sep. 26, 2014, designating the United States, which claims priority from Japanese Patent Application No. 2013-205516, filed Sep. 30, 2013, which are hereby incorporated herein by reference in their entirety.

TECHNICAL FIELD

The present invention relates to a cathode for a lithium ion secondary battery and a lithium ion secondary battery using the same.

BACKGROUND ART

Lithium ion secondary batteries are broadly used as energy devices with a high energy density as power sources for portable information terminals such as notebook computers, cell phones, and PDAs (Personal Digital Assistant). For typical lithium ion secondary batteries (hereinafter also referred to simply as "lithium battery"), a group of wound electrodes obtained by layering a cathode, an insulation layer, an anode, and an insulation layer in this order and coiling the same, or a group of laminated electrodes obtained by layering a cathode, an insulation layer, an anode, and an insulation layer, has been used. As an active material for an anode, a carbon material having a multilayer structure capable of intercalating (formation of a lithium intercalation compound) a lithium ion between layers and releasing the same is mainly used. As an active material for a cathode, a lithium-containing metal complex oxide, and as an insulation layer, a polyolefin porous film is mainly used. Such lithium ion secondary batteries have high battery capacities and output powers as well as superior charge and discharge cycle performances.

Although lithium ion secondary batteries are at a high level in terms of safety, further improvement of safety has been demanded in view of their high capacities and high power. For example, when lithium ion secondary batteries are overcharged, there is possibility of heat generation. Further, heat may also be generated by occurrence of an internal short-circuit. Moreover, since lithium ion secondary batteries contain a nonaqueous electrolyte containing an organic solvent, there is the possibility that the generated heat will cause chemical degradation of the organic solvent to generate a gas, leading to a trouble such as an increase in an internal pressure of a battery or the like.

Currently, further improvement of the safety of lithium ion secondary batteries is intended by cutting off a current inside the batteries to suppress heat generation, when the lithium ion secondary batteries are overcharged or the like. Examples of means for improving safety include: (1) a method of utilizing a mechanism, such as a safety valve provided in a sealing plate, which detects an internal pressure of a battery and cuts off the current; (2) a method in which a sealing plate is provided with a component composed of a PTC (Positive temperature coefficient) element of which electrical resistance increases according to the heat generation in the battery, and the current is cut off when the PTC element becomes a nonconductor; and (3) a method in which an insulation layer meltable corresponding to heat generation in the battery is used, and when the insulation layer melts down, movement of a lithium ion between a cathode and an anode is inhibited so that the current is cut off.

Meanwhile, as another method for cutting off a current to suppress heat generation, an electrode provided with a PTC layer has been proposed by Japanese National-Phase Publication (JP-A) No. 2002-526897, Japanese Patent Application Laid-Open (JP-A) No. H10-50294, and JP-A No. 2009-176599. A PTC layer indicates, similar to a PTC element, a layer having a function to increase the electrical resistance (direct current resistance) corresponding to heat generation of a battery. The electrode (at least one of a cathode and an anode) according to JP-A No. 2002-526897, JP-A No. H10-50294, and JP-A No. 2009-176599 is a layered body in which a cathode active material layer or an anode active material layer, a PTC layer, and a current collector are layered in this order. The PTC layer according to JP-A No. 2002-526897 is formed by mixing and heating an electrically conductive particle (carbon particle) and a binder resin (a polymer mixture of a low-density polyethylene and ethylene-vinyl acetate), forming the obtained mixture into a sheet, and then heat-treating the obtained sheet and layering the same on a current collector.

According to JP-A No. H10-50294, a PTC layer is formed by mixing electrically conductive microbeads and a matrix resin (a poly(vinylidene fluoride) powder) in an organic solvent to prepare a paste, coating the paste on a surface of a cathode current collector and a surface of an anode current collector, and drying the same. In such a PTC layer, an electrically conductive network is formed by mutual contact among the electrically conductive particles. With respect to the electrically conductive network, when a matrix resin expands due to overheating, the contact among electrically conductive particles is broken so as to cut off the current.

A PTC layer according to JP-A No. 2009-176599 is formed by preparing a paste by dispersing an electrically conductive particle (carbon particle) and a polymer particle (polyethylene particle) in water, coating the paste on a surface of a cathode current collector, and then drying the same.

SUMMARY OF INVENTION

Technical Problem

However, when the method (1) is used, since progress of a degradation reaction of an electrolyte solution, which causes a change in an internal pressure of a battery, is strongly affected not only by a battery temperature but also by a battery voltage, an environment temperature and the like, a response to heat generation becomes imprecise, and the inhibitory effect against heat generation may become insufficient. By the method (2), since an electrode group, which is a main heat generator, and a PTC element in a sealing plate are located with a certain distance from each other, the responsiveness of the PTC element with respect to heat generation may be lowered and the inhibitory effect against heat generation may become insufficient. By the method (3), it is necessary to use an insulation layer which melts responding well to heat generation in a battery. However, when such an insulation layer is used, for instance, a higher power or improved charge and discharge cycle performance of a battery may not be attained satisfactorily.

Meanwhile, with a constitution in which a PTC layer produced in advance in a sheet form is layered on a current collector as in the case of JP-A No. 2002-526897, it is anticipated that the initial internal resistance of a battery to be produced may increase. When the initial internal resistance of a battery is high, a higher power of a battery (superior discharge rate performance) may not be attainable.

In a case of an electrode according to JP-A No. H10-50294, a part of an electrically conductive network remains and is not cut off, even when a matrix resin expands. Consequently, an electrode of JP-A No. H10-50294 does not have reliable current cutoff correctness, and the current may not be cut off completely in an incident of overcharge.

A PTC layer according to JP-A No. 2009-176599 is intended to cut off a current, in a case in which a resin particle melts due to overheating and electrically conductive particles mutually fall into a noncontact condition. However, it has become clear through investigations by the inventors of the present invention that a cathode including the PTC layer of JP-A No. 2009-176599 can hardly attain a higher power because of increase in the initial internal resistance of a battery. A presumable reason behind the increase in the initial internal resistance is that electrically conductive particles are not dispersed adequately and therefore an electrically conductive network is not spread uniformly in the entire PTC layer.

The present invention was made in view of such problems with an object to provide a cathode for a lithium ion secondary battery, which has a function of increasing the internal resistance (hereinafter also referred to as "direct current resistance") of a battery when a temperature increases, and at the same time has superior discharge rate performance in a normal operation, as well as a lithium ion secondary battery using the same.

Solution to Problem

Specific means for achieving the object are as follows.
<1> A cathode for a lithium ion secondary battery, comprising:
  a cathode current collector;
  a PTC layer provided on the cathode current collector, the PTC layer comprising electrically conductive particles, polymer particles, and a water-soluble polymer; and
  a cathode active material layer provided on the PTC layer.
<2> The cathode for a lithium ion secondary battery according to <1> above, wherein the PTC layer has a thickness of from 1 μm to 10 μm.
<3> The cathode for a lithium ion secondary battery according to <1> or <2> above, wherein a mass ratio of a total amount of the electrically conductive particles and the polymer particles which are comprised in the PTC layer to the water-soluble polymer comprised in the PTC layer (a total amount of the electrically conductive particles and the polymer particles: the water-soluble polymer) is from 99.9: 0.1 to 95:5.
<4> The cathode for a lithium ion secondary battery according to any one of <1> to <3> above, wherein the polymer particles have an average particle diameter of from 0.1 μm to 5 μm.
<5> A lithium ion secondary battery, comprising the cathode for a lithium ion secondary battery according to any one of <1> to <4> above.

Advantageous Effects of Invention

According to the invention, a cathode for a lithium ion secondary battery, which has a function of increasing the internal resistance of a battery when a temperature increases, and at the same time has superior discharge rate performance in a normal operation, as well as a lithium ion secondary battery using the same can be provided.

DESCRIPTION OF EMBODIMENTS

Preferable Embodiments of the invention will be described below. The matter necessary for carrying out the invention, other than that specifically referred to herein, may be construed as a design matter to be supported by the conventional techniques in the pertinent art, for a person skilled in the art. The invention can be carried out on the basis of the contents disclosed herein and the common technical knowledge in the pertinent art. In the drawings presented below, members and parts demonstrating the same action are denoted by the same reference numerals and redundant explanation thereof may be occasionally omitted or simplified. Dimensional relationships (length, width, thickness, or the like) in the drawings do not necessarily reflect the actual dimensional relationships.

A numerical range expressed by "x to y" includes the values of x and y in the range as the minimum and maximum values, respectively. In referring herein to a content of a component in a composition, when plural substances exist corresponding to a component in the composition, the content means, unless otherwise specified, the total amount of the plural substances existing in the composition. Further, the term "layer" comprehends herein not only a structure formed over the whole surface when observed as a plan view, but also a structure formed only on a part of the same.

The technology according to the invention is broadly applicable to various nonaqueous secondary batteries provided with an electrode in such a form that an electrode active material is retained on a current collector. In this kind of batteries, a PTC layer according to the technology of the invention is provided between the current collector and the electrode active material layer, whereby the electrical resistance between the current collector and the active material layer is increased when the temperature of the battery increases and the current flow is suppressed, leading to exertion of an effect of suppressing overheating of the battery. The invention will be described more specifically below mainly by way of an example of a cathode having a PTC layer between an electrode active material layer containing a cathode active material (cathode active material layer) and a current collector, as well as a lithium ion secondary battery provided with the cathode, provided that the applicable object of the invention is not intended to be limited to such an electrode or battery.

(Cathode for Lithium Ion Secondary Battery)

A cathode for a lithium ion secondary battery according to the invention includes: a cathode current collector; a PTC layer provided on the cathode current collector, the PTC layer including electrically conductive particles, polymer particles, and a water-soluble polymer; and a cathode active material layer provided on the PTC layer.

By use of a water-soluble polymer in a PTC layer, the electrically conductive particles tend to be easily distributed uniformly in the PTC layer, whereby an electrically conductive network, which is pathways for electron movement, are formed in the entire PTC layer. Further, by use of a water-soluble polymer in a PTC layer, the adhesion between a current collector and a PTC layer, and between an active material layer and a PTC layer is enhanced. As a result, when a cathode having a PTC layer according to the invention is incorporated in a lithium ion secondary battery, reduction of the initial internal resistance is possible, and a higher power output of a battery can be attained.

When the PTC layer is an aggregate of electrically conductive particles, polymer particles, and a water-soluble polymer, the electrically conductive particles are an electrically conductive inorganic particle, and the polymer particle is a particulate of a non-electroconductive and thermoplastic resin, and the thickness of the PTC layer is thin, the output power characteristic of a lithium ion secondary battery using the cathode having the PTC layer is be further improved. Namely, since the electron movement distance in a PTC layer becomes short, the response of the electron movement from a cathode active material layer to a current collector becomes further uniform. As a result, the output power characteristic is further improved. In view of the above, the thickness of a PTC layer is preferably 10 µm or less, more preferably 8 µm or less, and still more preferably 6 µm or less. There is no particular restriction on the lower limit of the thickness of a PTC layer, and from a viewpoint of a film formation property it is preferably 1 µm or more, more preferably 2 µm or more, and still more preferably 3 µm or more.

Further, since a PTC layer according to the invention cuts off a current flow in the PTC layer securely when the PTC layer reaches a predetermined temperature due to heat generation, it can not only have a function of suppressing additional heat generation (hereinafter occasionally also referred to as "PTC function"), but also improve the discharge rate performance and the charge and discharge cycle performance (hereinafter occasionally also referred to as "cycle performance").

According to the invention, as a cathode current collector, those used commonly in the field of a lithium ion secondary battery may be used. Specific examples thereof include a sheet and a foil, which contain a stainless steel, aluminum, or titanium. Among them, aluminum is preferable. The thickness of the sheet or foil is not particularly limited, and is, for example, preferably from 1 µm to 500 µm, more preferably from 2 µm to 100 µm, and still more preferably from 5 µm to 50 µm.

A PTC layer is, as described above, an aggregate of a mixture of electrically conductive particles, polymer particles, and a water-soluble polymer. When the aggregate deforms at a predetermined temperature (current cutoff temperature), the current flow is cut off and further heat generation is suppressed. The current cut off temperature may be appropriately set by selecting a kind of polymer particle, the content of a polymer particle, or the like.

Examples of the electrically conductive particles include: a carbon particle such as graphite, acetylene black, Ketjen-black, channel black, furnace black, lamp black, or thermal black; a metal particle such as a nickel particle; a metal carbide such as WC, $B_4C$, ZrC, NbC, MoC, TiC, or TaC; a metal nitride such as TiN, ZrN, or TaN; and a metal silicide such as $WSi_2$, or $MoSi_2$. Among them, as the electrically conductive particle, a carbon particle and a metal particle are preferable, and a carbon particle is more preferable. The electrically conductive particles may be used singly, or in combination of two or more kinds thereof. Further, as an electrically conductive particle, an electrically conductive particle having a PTC function may be used, and examples thereof include an alkaline earth metal titanate such as barium titanate, barium strontium titanate, or barium lead titanate; and a solid solution of an alkaline earth metal titanate dissolving a different metal.

When a carbon particle is used as an electrically conductive particle, the average particle diameter of primary particles constituting the powder is, from a viewpoint of improvement of battery characteristics, preferably from 10 nm to 500 nm, more preferably from 15 nm to 200 nm, and still more preferably from 20 nm to 100 nm.

As the electrically conductive particle, acetylene black having a structure in which primary particles are strung to some degree is particularly preferable. The degree of stringing of primary particles (degree of development of the structure) is for example approx. from 5 to 50 in terms of a shape coefficient calculated for acetylene black by dividing an average length of a string of aligned primary particles by the average diameter of primary particles.

There is no particular restriction on the polymer particles, insofar as it is a particulate of a non-electroconductive and thermoplastic resin. Examples of such a polymer particle include particles of polyethylene, polypropylene, an ethylene-vinyl acetate copolymer (EVA), an ethylene-acrylic acid copolymer, an ethylene-methacrylic acid copolymer, poly (vinyl chloride), poly(vinylidene chloride), poly(vinyl fluoride), poly(vinylidene fluoride), polyamide, polystyrene, polyacrylonitrile, a thermoplastic elastomer, poly(ethylene oxide), polyacetal, a thermoplastic modified cellulose, polysulfone, poly(methyl(meth)acrylate), a (meth)acrylate-containing copolymer, and an ionomer resin. Among them, a polyolefin particle such as polyethylene or polypropylene is preferable as the polymer particle. The polymer particles may be used singly, or in combination of two or more kinds thereof. From a viewpoint of further improvement of adhesion strength, use of a polyolefin particle in combination with a particle of a (meth)acrylate-containing copolymer, or a polyolefin particle in combination with an ionomer resin particle is particularly preferable. In this regard, (meth) acrylate means herein acrylate or methacrylate.

The ionomer resin is a resin in which carboxylic acid groups in a copolymer of ethylene-unsaturated carboxylic acid are ionized at least partly with a metal ion, and ionically cross-linked with a metal ion. Examples of an unsaturated carboxylic acid to form a copolymer with ethylene include a C3 to C9 unsaturated carboxylic acid, and examples thereof include acrylic acid, methacrylic acid, maleic acid, fumaric acid, and vinylbenzoic acid. The copolymer may be copolymerized with an unsaturated carboxylic acid ester. Examples of the unsaturated carboxylic acid ester include methyl acrylate, ethyl acrylate, butyl acrylate, 2-ethylhexyl acrylate, methyl methacrylate, butyl methacrylate, butyl maleate, butyl fumarate, vinyl acetate, vinyl propionate, vinyl stearate, and a higher tertiary vinyl ester. The copolymer may be copolymerized with an α-olefin. Examples of an α-olefin include propylene, butene, pentene, hexene, heptene, methylbutene, methylpentene, vinyl chloride, and vinyl bromide.

Further, styrene or the like may be graft-polymerized on the copolymer of ethylene-unsaturated carboxylic acid. As the metal ion, sodium, potassium, calcium, barium, zinc, cobalt, nickel, magnesium, copper, lead or the like may be used in a form of a formate, an acetate, a nitrate, a carbonate, a hydrogencarbonate, an oxide, a hydroxide, an alkoxide or the like.

As the ionomer resin, a waterborne ethylenic ionomer resin is more preferable. Examples of the waterborne ethylenic ionomer resin include an ethylene-methacrylic acid copolymer, an ethylene-acrylic acid copolymer, an ethylene-acrylate copolymer, and a graft copolymer of ethylene acrylic acid copolymer and styrene. Examples of a metal ion include sodium, zinc, and magnesium.

As the ionomer resin, for example, CHEMIPEARL® (Mitsui Chemicals, Inc.), HIMILAN® (Dupont-Mitsui Polychemicals Co., Ltd.), and SURLYN® A (E. I. du Pont de Nemours and Company) are available. As an ethylene-acrylic acid copolymer or an ethylene-acrylate copolymer, for example, NUCREL® and ELVALOY® (Dupont-Mitsui Polychemicals Co., Ltd.) are available.

The average particle diameter of the polymer particles is not particularly limited, and from a viewpoint of further improvement of battery characteristics, is preferably from 0.05 µm to 5 µm, more preferably from 0.1 µm to 5 µm, still more preferably from 0.2 µm to 2 µm, and particularly preferably from 0.3 µm to 1 µm.

The content ratio of the electrically conductive particle and polymer particle is not particularly limited, and the mass ratio therebetween is preferably from 2:98 to 20:80, more preferably 3:97 to 15:85, and still more preferably from 5:95 to 10:90. When the content ratio of an electrically conductive particle is 2 or more, an electron movement pathway in a PTC layer is secured, and the output power characteristic of a battery tends to be improved. When the content ratio of an electrically conductive particle is 20 or less, a PTC function is exhibited, and the responsiveness to heat generation for current cutoff tends to be improved.

The average particle diameters of electrically conductive particles and polymer particles may each be determined, for example, as a value obtained by coating an aqueous dispersion slurry of the electrically conductive particles, polymer particles, and a water-soluble polymer onto a current collector and removing water therefrom, to form a current collector with a PTC layer having a thickness of about 5 µm; and calculating an arithmetic mean of the long side lengths of all the particles in an transmission electron micrograph image at a central region of the current collector in a size of 10 µm-long×10 µm-wide.

Examples of the water-soluble polymer include carboxymethylcellulose, a carboxymethylcellulose derivative such as sodium carboxymethylcellulose, poly(vinyl alcohol), poly(vinyl pyrrolidone), a water-soluble alginic acid derivative, gelatin, carrageenan, glucomannan, pectin, curdlan, gellan gum, poly(acrylic acid), and a derivative thereof. Among them, as the water-soluble polymer, a carboxymethylcellulose derivative, poly(vinyl alcohol), poly(vinyl pyrrolidone), and poly(acrylic acid) are more preferable, a carboxymethylcellulose derivative, poly(vinyl pyrrolidone), and poly(acrylic acid) are still more preferable, and a carboxymethylcellulose derivative is particularly preferable. There is no particular restriction to the content ratio of the total amount of the electrically conductive particles and the polymer particles to the water-soluble polymer, which are contained respectively in a PTC layer, and the mass ratio thereof (a total amount of the electrically conductive particles and the polymer particles/the water-soluble polymer) is preferably from 99.9:0.1 to 95:5, more preferably from 99.5:0.5 to 97:3, and still more preferably from 99.5:0.5 to 98:2. When the content ratio of a water-soluble polymer is 0.1 or more, electrically conductive particles are dispersed thoroughly and electron movement pathways in a PTC layer are fully secured, whereby the battery characteristics may be improved. When the content ratio of a water-soluble polymer is 5 or less, the viscosity of a dispersion liquid to be obtained becomes low, and coating thereof onto a collector foil may become easier.

The term "polymer" means herein that a water-soluble polymer has a number average molecular weight of 1,000 or more.

The number average molecular weight of a water-soluble polymer is, from a viewpoint of the dispersibility of electrically conductive particles, preferably 10,000 or more, more preferably 200,000 or more, and still more preferably 300,000 or more. The upper limit of the number average molecular weight of a water-soluble polymer is not particularly limited, and from a practical viewpoint, is preferably 1,000,000 or less.

From the same viewpoint as above, the weight-average molecular weight of a water-soluble polymer is preferably 50,000 or more, more preferably 1,000,000 or more, and still more preferably 2,000,000 or more. The upper limit of the weight average molecular weight of a water-soluble polymer is not particularly limited, and from a practical viewpoint, is preferably 5,000,000 or less.

The number average molecular weight and weight average molecular weight of a water-soluble polymer may be calculated, for example, from a calibration curve obtained by connecting a GPC column with a HPLC system provided with a differential refractometer as a detector, using as an eluent a mixture solution of a NaCl aqueous solution and acetonitrile, and using pullulan as a reference substance.

The viscosity (60 rpm) at 25° C. of a water-soluble polymer prepared to a 1 mass % aqueous solution is preferably from 100 mPa·s to 8,000 mPa·s, more preferably from 500 mPa·s to 6,000 mPa·s, and still more preferably from 1,000 mPa·s to 4,000 mPa·s.

The current cutoff temperature of a PTC layer is preferably set at from 70° C. to 140° C., and more preferably set at from 90° C. to 120° C. When the current cutoff temperature is set at from 70° C. to 140° C., in an incident of a trouble in a battery itself or various devices mounted with a battery, the current can be cut off so as to suppress heat generation, and also the power supply and the like from the battery to such various devices can be stopped, and therefore extremely high safety can be obtained. Further, when the current cutoff temperature is set at from 90° C. to 120° C., such advantages that malfunctioning in a normal operation can be avoided and the current can be securely cut off in an incident of a trouble such as overcharging, can be obtained. The current cutoff temperature depends on the melting point of a polymer particle.

The lower the melting point of a polymer particle is, the lower the temperature becomes at which the current can be cut off when a battery heats up. The higher the melting point is, the higher the temperature becomes at which drying is performed in forming a PTC layer and a cathode, whereby productivity is further improved. From these viewpoints, the melting point is preferably from 60 to 160° C., more preferably from 80 to 140° C., and still more preferably from 100 to 120° C. A melting point of a polymer particle may be calculated from an endothermic peak temperature after measuring a specific heat capacity of the particle in an inert gas as a function of temperature using a differential scanning calorimeter.

When the current cutoff temperature is to be set at from 90° C. to 120° C., it is preferable to use a polyethylene particle as a polymer particle.

The thickness of the PTC layer is preferably from 1 μm to 10 μm, more preferably from 2 μm to 8 μm, and still more preferably from 3 μm to 6 μm, from a viewpoint of balance between battery characteristics and a PTC function.

The cathode active material layer is formed on either surface or both surfaces in the thickness direction of a cathode current collector, and contains a cathode active material, and, if necessary, may further contain an electroconductive material, a binder, or the like. As a cathode active material, those used commonly in the technical field may be used, and examples thereof include a lithium-containing composite metal oxide, an olivine type lithium salt, a chalcogen compound, and manganese dioxide. The lithium-containing composite metal oxide is a metallic oxide containing lithium and a transition metal, or a metallic oxide in which a part of the transition metal in the metallic oxide is replaced with a different element. Examples of such a different element include Na, Mg, Sc, Y, Mn, Fe, Co, Ni, Cu, Zn, Al, Cr, Pb, Sb, V, and B, and Mn, Al, Co, Ni, Mg, and the like are preferable. The different elements may be used singly, or in combination of two or more kinds thereof.

Among them, a lithium-containing composite metal oxide is preferable as the cathode active material. Examples of the lithium-containing composite metal oxide include $Li_xCoO_2$, $Li_xNiO_2$, $Li_xMnO_2$, $Li_xCo_yNi_{1-y}O_2$, $Li_xNi_{1-y}M_yO_z$, $Li_xNi_{1-y}M_yO_z$, $Li_xMn_2O_4$, and $Li_xMn_{2-y}M_yO_4$ (in the formulas, M represents at least one element selected from the group consisting of Na, Mg, Sc, Y, Mn, Fe, Co, Ni, Cu, Zn, Al, Cr, Pb, Sb, V, and B; x=0 to 1.2, y=0 to 0.9, and z=2.0 to 2.3). Herein, the x value representing the molar ratio of lithium fluctuates by charging and discharging. Examples of the olivine type lithium salt include $LiFePO_4$. Examples of the chalcogen compound include titanium disulfide and molybdenum disulfide. The cathode active materials may be used singly, or in combination of two or more kinds thereof.

The cathode active material contains preferably lithium manganese oxide expressed by $Li_xMn_2O_4$ or $Li_xMn_{2-y}M_yO_4$ from a viewpoint of safety. In a case in which lithium manganese oxide is used for a cathode active material, the content of lithium manganese oxide is preferably 30 mass % or more, and more preferably 40 mass % or more, with respect to the total amount of the cathode active material.

Examples of the electroconductive material which may be used in a cathode active material layer include carbon black, graphite, a carbon fiber, and a metal fiber. Examples of carbon black include acetylene black, Ketjenblack, channel black, furnace black, lamp black, and thermal black. Examples of graphite include natural graphite and artificial graphite. The electroconductive materials may be used singly, or in combination of two or more kinds thereof.

Examples of the binder which may be used in a cathode active material layer include polyethylene, polypropylene, poly(vinyl acetate), poly(methyl methacrylate), nitrocellulose, a fluororesin, and a rubber particle. Examples of the fluororesin include polytetrafluoroethylene (PTFE), poly (vinylidene fluoride) (PVDF), a tetrafluoroethylene-hexafluoropropylene copolymer (FEP), and a vinylidene fluoride-hexafluoropropylene copolymer. Examples of the rubber particle include a styrene-butadiene rubber particle and an acrylonitrile rubber particle. Among them, in consideration of improvement of oxidation resistance of a cathode active material layer and the like, a binder containing fluorine is preferable. The binders may be used singly, or, if necessary, used in combination of two or more kinds thereof.

A cathode active material layer may be formed, for example, by coating a cathode mixture paste on a PTC layer, followed by drying, and, if necessary, by rolling. The cathode mixture paste may be prepared by adding a cathode active material together with a binder, an electroconductive material, or the like into a dispersing medium, followed by mixing. Examples of the dispersing medium to be used include N-methyl-2-pyrrolidone (NMP), tetrahydrofuran, and dimethyl formamide. In this connection, it is preferable to select a dispersing medium which does not dissolve a polymer particle to be contained in a PTC layer. Some of polymer particles are soluble neither in an organic solvent nor in water, and when such polymer particles are used, selection of the kind of a dispersing medium is unnecessary.

When such a cathode active material layer containing the cathode active material, the electroconductive material, and the binder is formed for a lithium ion secondary battery according to the invention, the packing density of the cathode active material layer is preferably in a range of from 2.2 $g/cm^3$ to 2.8 $g/cm^3$, more preferably in a range of from 2.3 $g/cm^3$ to 2.7 $g/cm^3$, and still more preferably in a range of from 2.4 $g/cm^3$ to 2.6 $g/cm^3$. When the packing density of the cathode active material layer is 2.8 $g/cm^3$ or less, a nonaqueous electrolyte tends to easily infiltrate into the cathode active material layer, and the diffusion speed of lithium ions tends to increase during high-current charge and discharge, whereby the cycle performance may be improved. On the other hand, when the packing density of the cathode active material layer is 2.2 $g/cm^3$ or more, the contact between the cathode active material and the electroconductive material is fully secured, so as to reduce the electrical resistance, and the discharge rate performance may be improved.

When a cathode is produced by coating the cathode mixture paste on a cathode current collector for a lithium ion secondary battery according to the invention, the coating amount of the cathode mixture paste after evaporating a dispersing medium (cathode active material layer) is preferably in a range of from 100 $g/m^2$ to 300 $g/m^2$, more preferably in a range of from 150 $g/m^2$ to 250 $g/m^2$, and still more preferably in a range of from 180 $g/m^2$ to 220 $g/m^2$. When the coating amount is 100 $g/m^2$ or more, the cathode active material layer does not become too thin and a sufficient battery capacity can be obtained. When the coating amount is 300 $g/m^2$ or less, the cathode active material layer does not become too thick, so that unevenness in a reaction in the thickness direction does not appear during high-current charge and discharge, and the cycle performance is improved.

Meanwhile, from the viewpoints of discharge capacity and discharge rate performance, the thickness of the cathode active material layer is preferably from 50 μm to 150 μm, more preferably from 60 μm to 120 μm, and still more preferably from 70 μm to 110 μm.

(Lithium Ion Secondary Battery)

A lithium ion secondary battery according to the invention may adopt the same configuration as a conventional lithium ion secondary battery except the cathode. For example, a lithium ion secondary battery according to the invention includes a cathode, an anode, an insulation layer, and a nonaqueous electrolyte.

A cathode is provided to face an anode via an insulation layer, and includes a cathode current collector, a PTC layer, and a cathode active material layer. As the cathode, a cathode for a lithium ion secondary battery according to the invention is provided.

An anode is provided to face the cathode via an insulation layer, and includes an anode current collector and an anode active material layer. Examples of the anode current collector include a sheet, a foil or the like containing a stainless steel, nickel, copper, or the like. The thickness of a sheet and a foil is not particularly limited, and is, for example, preferably from 1 µm to 500 µm, more preferably from 2 µm to 100 µm, and still more preferably from 5 µm to 50 µm. The anode active material layer is formed on either or both surfaces in the thickness direction of an anode current collector, and contains an anode active material, and, if necessary, may further contain a binder, an electroconductive material, a thickener, or the like.

As an anode active material, a material which is capable of absorbing and releasing a lithium ion and has been used commonly in the field of a lithium ion secondary battery may be used. Examples of the anode active material include metallic lithium, a lithium alloy, an intermetallic compound, a carbon material, an organic compound, an inorganic compound, a metal complex, and an organic polymer compound. The anode active materials may be used singly, or in combination of two or more kinds thereof. Among them, a carbon material is preferable as an anode active material. Examples of the carbon material include: graphite such as natural graphite (scale-liked graphite, or the like) or artificial graphite; carbon black such as acetylene black, Ketjenblack, channel black, furnace black, lamp black, or thermal black; and a carbon fiber. The volume average particle diameter of a carbon material is preferably from 0.1 µm to 60 µm, and more preferably from 0.5 µm to 30 µm. Meanwhile, the BET specific surface area of a carbon material is preferably from 1 $m^2/g$ to 10 $m^2/g$. Among the carbon materials, especially graphite in which a distance ($d_{002}$) between carbon hexagonal planes according to wide-angle X-ray diffractometry is from 3.35 Å to 3.40 Å, and a crystallite (Lc) in the c axis direction is 100 Å or more, is preferable from a viewpoint of further improvement of the discharge capacity of a battery.

Among the carbon materials, from the viewpoints of further improvement of cycle performance and safety, amorphous carbon in which a distance ($d_{002}$) between carbon hexagonal planes according to wide-angle X-ray diffractometry is from 3.5 Å to 3.95 Å, is particularly preferable.

As an electroconductive material usable for an anode active material layer, the same electroconductive material as contained in a cathode active material layer may be used. Further, as a binder which may be used for an anode active material layer, those used commonly in the field of a lithium ion secondary battery may be used. Examples thereof include polyethylene, polypropylene, polytetrafluoroethylene, poly(vinylidene fluoride), a styrene butadiene rubber, and an acrylic rubber. Examples of a thickener which may be used for an anode active material layer include carboxymethylcellulose. The anode active material layer may be formed, for example, by coating an anode mixture paste on a surface of an anode current collector, followed by drying, and, if necessary, rolling. The anode mixture paste may be prepared, for example, by adding an anode active material together with, if necessary, a binder, an electroconductive material, a thickener, or the like into a dispersing medium, followed by mixing. Examples of the dispersing medium to be used include N-methyl-2-pyrrolidone (NMP) and water.

An insulation layer (hereinbelow occasionally also referred to as "separator") is provided between a cathode and an anode and insulates the cathode and the anode. For an insulation layer, those having ion permeability such as an inorganic porous film may be used. As a separator, those used commonly in the field of a lithium ion secondary battery may be used, and examples thereof include a resinous porous sheet. Examples of a resin composing a resinous porous sheet include a polyolefin such as polyethylene or polypropylene, polyamide, and polyamide-imide. The resinous porous sheet includes also a nonwoven fabric, a woven fabric, and the like. Among them, a porous sheet in which pores having a diameter of from about 0.05 µm to 0.15 µm are formed inside is preferable. Such a porous sheet has high levels of ion permeability, mechanical strength, and insulation property. There is no particular restriction to the thickness of a porous sheet.

An inorganic porous film contains mainly an inorganic compound, and has high heat resistance. Examples of an inorganic compound include an inorganic oxide such as alumina or silica, an inorganic nitride such as BN or $Si_3N_4$, and a porous inorganic compound such as zeolite. The inorganic compounds may be used singly, or in combination of two or more kinds thereof. An inorganic porous film may further contain a heat-resistant resin. There is no particular restriction on a heat-resistant resin, and examples thereof include polyamide and polyimide. Further, the thickness of an inorganic porous film is not particularly limited, and is preferably from 0.5 µm to 30 µm, and more preferably from 1 µm to 20 µm.

Examples of a nonaqueous electrolyte include a liquid nonaqueous electrolyte, a gel-form nonaqueous electrolyte, and a solid electrolyte (for example, solid polymer electrolyte). A liquid nonaqueous electrolyte contains a solute (supporting electrolyte) and a nonaqueous solvent, and further contains, if necessary, various additives. A solute is ordinarily soluble in a nonaqueous solvent. The liquid nonaqueous electrolyte is, for example, impregnated into an insulation layer.

As the solute, those used commonly in the field may be used, and examples thereof include $LiClO_4$, $LiBF_4$, $LiPF_6$, $LiAlCl_4$, $LiSbF_6$, LiSCN, $LiCF_3SO_3$, $LiCF_3CO_2$, $LiAsF_6$, $LiB_{10}Cl_{10}$, a lithium lower-aliphatic carboxylate, LiCl, LiBr, LiI, chloroborane lithium, a borate, and an imide salt. Examples of a borate include lithium bis(1,2-benzenediolate (2-)-O,O')borate, lithium bis(2,3-naphthalenediolate (2-)-O, O')borate, lithium bis(2,2'-biphenyldiolate (2-)-O,O')borate, and lithium bis(5-fluoro-2-olate-1-benzene sulfonic acid-O, O')borate. Examples of an imide salt include bis(trifluoromethane)sulfonimide lithium (($CF_3SO_2)_2NLi$), trifluoromethanesulfonyl (nonafluorobutane)sulfonimide lithium (($CF_3SO_2)(C_4F_9SO_2)NLi$), and bis(pentafluoroethanesulfonyl)imide lithium (($C_2F_5SO_2)_2NLi$). The solutes may be used singly, or, if necessary, used in combination of two or more kinds thereof. The amount of a solute dissolved in a nonaqueous solvent is preferably from 0.5 mol/L to 2 mol/L.

As a nonaqueous solvent, those used commonly in the field may be used. Examples thereof include a cyclic carbonate ester, an open-chain carbonate ester, and a cyclic carboxylic acid ester. Examples of a cyclic carbonate ester include propylene carbonate (PC) and ethylene carbonate (EC). Examples of an open-chain carbonate ester include diethyl carbonate (DEC), ethyl methyl carbonate (EMC), and dimethyl carbonate (DMC). Examples of a cyclic carboxylic acid ester include γ-butyrolactone (GBL) and γ-valerolactone (GVL). The nonaqueous solvents may be used singly, or, if necessary, used in combination of two or more kinds thereof.

The nonaqueous solvent contains preferably vinylene carbonate (VC) from a viewpoint of further improvement of battery characteristics.

When vinylene carbonate (VC) is contained, the content thereof with respect to the total amount of the nonaqueous solvent is preferably from 0.1 mass % to 2 mass %, and more preferably from 0.2 mass % to 1.5 mass %.

Next, an embodiment in which the invention is applied to a laminated battery will be described.

A laminated lithium ion secondary battery may be produced, for example, as follows. First, a cathode and an anode are cut into rectangular shapes, to each of which a tab is welded to prepare a positive or an anode terminal. A cathode, an insulation layer, and an anode are layered in this order to produce a laminate. The laminate is then placed as it is in an aluminum-made laminate package with the positive and anode terminals being extended outward from the aluminum laminate package, and then the laminate package is closed tightly. Next, a nonaqueous electrolyte is injected into the aluminum laminate package and an opening in the aluminum laminate package is closed tightly, thereby obtaining a lithium ion secondary battery.

Figure 1:
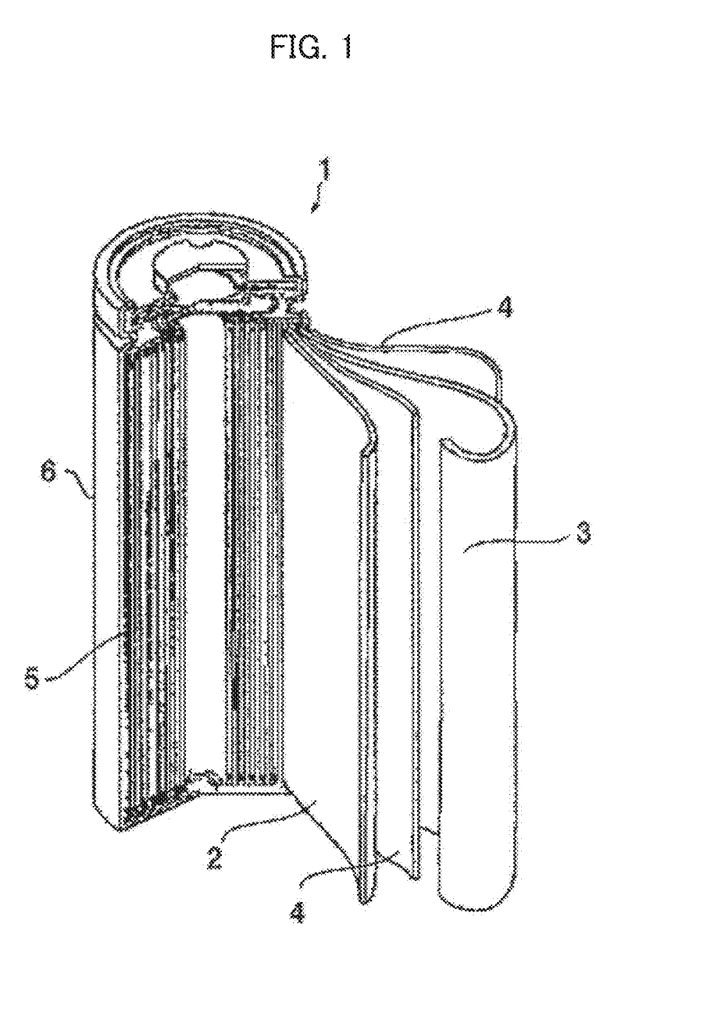
FIG. 1 is a cross-sectional view of a cylindrical lithium ion secondary battery of an embodiment to which the invention is applicable.

Next, an embodiment in which the invention is applied to a 18650-type cylindrical lithium ion secondary battery will be described by referring to a drawing.

As depicted in FIG. 1, a lithium ion secondary battery 1 of the present embodiment has a closed-bottom cylindrical battery container 6, which is made of nickel plated steel. The battery container 6 accommodates an electrode group 5 having a spiral cross-section formed by coiling a cathode plate 2 and an anode plate 3 both in a strip shape via a separator 4. The electrode group 5 is a coil with a spiral cross-section of a cathode plate 2 and an anode plate 3 via a separator 4 which is a polyethylene-made porous sheet. The separator 4 is defined, for example, in a size of 58 mm in width and 30 μm in thickness. A ribbon-shaped aluminum-made cathode tab terminal, an end of which is fixed to the cathode plate 2, protrudes from the upper end surface of the electrode group 5. The other end of the cathode tab terminal is fixed by ultrasonic welding to the lower surface of a disk-shaped battery cover, which is placed above the electrode group 5 and works as a cathode external terminal. Meanwhile, a ribbon-shaped copper-made anode tab terminal, an end of which is fixed to the anode plate 3, protrudes from the lower end surface of the electrode group 5. The other end of the anode tab terminal is fixed by resistance welding to the internal bottom of a battery container 6. Therefore, the cathode tab terminal and the anode tab terminal protrude in mutually opposite directions from either of the end surfaces of the electrode group 5. In this regard, around the entire outer circumference of the electrode group 5, an insulation cover is provided, depiction of which is omitted. The battery cover is fixed to the upper edge of the battery container 6 by crimping via a resinous insulation gasket. Therefore, the inside of the lithium ion secondary battery 1 is isolated tightly. Inside the battery container 6, a nonaqueous electrolyte solution has been filled (not depicted).

With respect to a lithium ion secondary battery provided with a PTC layer according to the invention, a rate of resistance increase from a direct current resistance of the battery at 25° C. to a direct current resistance at 120° C. is preferably 110% or more, more preferably 130% or more, and still more preferably 150% or more, in view of a service environment.

A lithium ion secondary battery according to the invention offers high safety as well as high power, and is capable of being applied favorably to the same uses as a conventional nonaqueous electrolyte secondary battery. It can be favorably used especially as a power source for various portable electronic devices such as a cell phone, a notebook computer, a portable information terminal, an electronic dictionary, or a video game console. When the battery is applied to such uses, even when an overcharging condition appears by any chance during battery charging, heat generation can be suppressed, so that heating-up, swelling, or the like of the battery can be prevented securely. Further, a lithium ion secondary battery according to the invention is capable of being also applied to the uses in power storage, a transportation machine such as an electric car or a hybrid car, and the like.

EXAMPLES

Hereinbelow, the invention will be described more specifically by way of Examples and Comparative Examples.

Example 1

(1) Production of PTC Layer

Acetylene black (electrically conductive particle, trade name: HS-100, average particle diameter 48 nm (a value in a catalog of Denka Company Limited), Denka Company Limited), an aqueous dispersion of a polyethylene particle (polymer particle, trade name: CHEMIPEARL® W4005, average particle diameter 0.6 μm (a value in a catalog of Mitsui Chemicals, Inc.), Mitsui Chemicals, Inc.), and a sodium salt of carboxymethylcellulose (water-soluble polymer, trade name: CMC #2200, weight average molecular weight 3,000,000, number average molecular weight 400,000, Daicel FineChem Ltd.) were mixed and dispersed at a mass ratio with respect to the solid contents (acetylene black:polyethylene particle:CMC) of 5:94:1. Distilled water was added to the yielded mixture to prepare a paste for forming a PTC layer. The paste for forming a PTC layer was coated on a single surface of a 17 μm-thick aluminum foil (cathode current collector, Mitsubishi Aluminum Company, Ltd.), dried at 60° C. to yield a 5 μm-thick PTC layer.

(2) Production of Cathode

First, 90 parts by mass of $LiMn_2O_4$ (cathode active material, Mitsui Mining & Smelting Co., Ltd.), 4.5 parts by mass of acetylene black (electroconductive material, trade name: HS-100, average particle diameter 48 nm (a value in catalog of Denka Company Limited), Denka Company Limited), 45.83 parts by mass of a poly(vinylidene fluoride) solution (binder, trade name: KUREHA KF Polymer #1120, solid content 12 mass-%, Kureha Corporation), and 4.2 parts by mass of N-methyl-2-pyrrolidone (NMP) were mixed to prepare a cathode mixture paste. The cathode mixture paste was coated on the PTC layer surface formed on the cathode current collector, dried at 60° C., and then rolled to form a cathode active material layer with a thickness of 75 μm, a coating amount of 200 g/m², and a mixture density of 2.5 g/cm³, thereby producing a cathode.

(3) Production of Laminated Battery

The produced cathode was cut into a 13.5 cm² rectangle to obtain an electrode for evaluation. A lithium foil (thickness 1 mm), a separator made of a polyethylene porous sheet (trade name: HIPORE, thickness: 30 μm, Asahi Kasei Corporation), and the cathode cut into a 13.5 cm² rectangle were layered to prepare a laminate. The laminate was placed in an aluminum laminate container (trade name: ALUMINUM LAMINATE FILM, Dai Nippon Printing Co., Ltd.), and 1 mL of a nonaqueous electrolyte (trade name: SOL-RITE, Mitsubishi Chemical Corporation, a mixture solution of ethylene carbonate/methyl ethyl carbonate/dimethyl carbonate=2/2/3 (volume ratio) containing a 1 M $LiPF_6$, to which 0.8 mass % of vinylene carbonate has been added with respect to the total amount of the mixture solution) was added thereto, and the aluminum laminate container was heat-sealed to produce a laminated battery for evaluation of an electrode.

Figure 2:
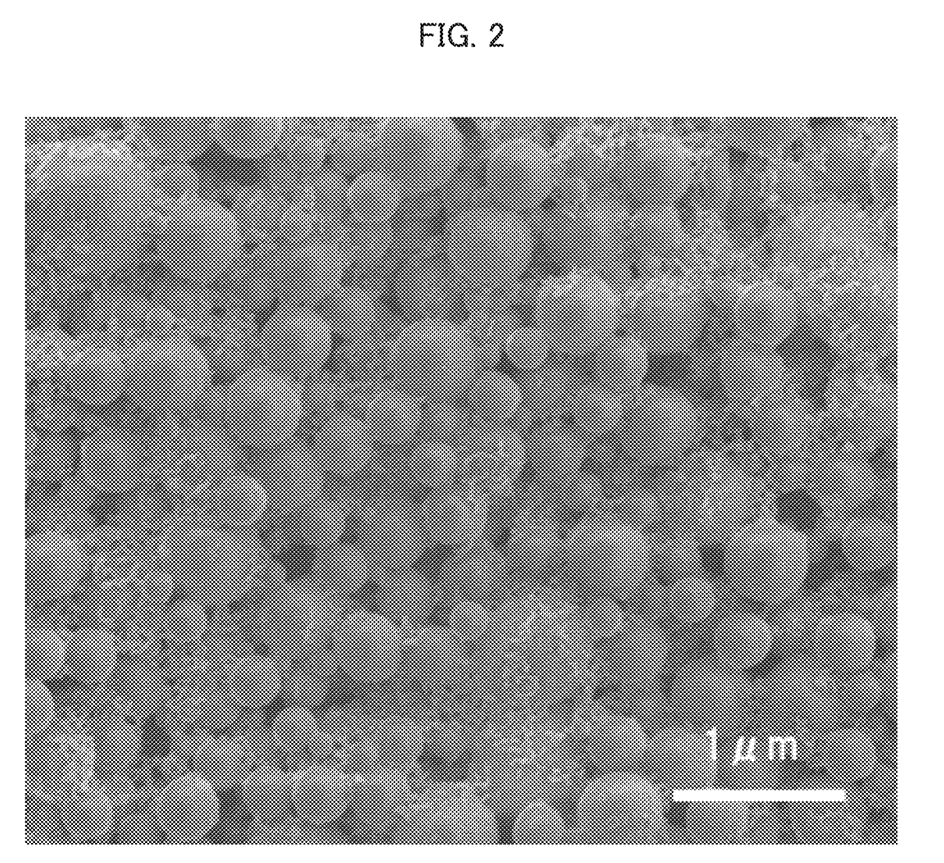
FIG. 2 is a scanning electron micrograph of a surface of a PTC layer obtained in Example 1.

FIG. 2 shows a scanning electron micrograph of a surface of the PTC layer obtained in Example 1.

Example 2

A laminated battery according to the invention was produced in the same manner as in Example 1, except that poly(vinyl pyrrolidone) (trade name: PVP K90, weight average molecular weight 67,000, number average molecular weight 42,000, Wako Pure Chemical Industries, Ltd.) was used instead of the sodium salt of carboxymethylcellulose as a water-soluble polymer.

Example 3

A laminated battery was produced in the same manner as in Example 1, except that poly(acrylic acid) (trade name: PAA, weight average molecular weight 1,300,000, number average molecular weight 230,000, Wako Pure Chemical Industries, Ltd.) was used instead of the sodium salt of carboxymethylcellulose as a water-soluble polymer.

Example 4

A laminated battery was produced in the same manner as in Example 1, except that the thickness of the PTC layer was changed to 7 μm.

Example 5

A laminated battery was produced in the same manner as in Example 1, except that the thickness of the PTC layer was changed to 10 μm.

Example 6

A laminated battery was produced in the same manner as in Example 1, except that the content ratio between the acetylene black and the aqueous dispersion of a polyethylene particle was changed to 10:89 in terms of mass ratio based on the solid content.

Example 7

A laminated battery was produced in the same manner as in Example 1, except that the content ratio of the acetylene black to the aqueous dispersion of a polyethylene particle was changed to 15:84 in terms of mass ratio based on the solid content.

Comparative Example 1

A laminated battery was produced in the same manner as in Example 1, except that the PTC layer was not provided on a surface of the cathode current collector.

Comparative Example 2

A laminated battery was produced in the same manner as in Example 1, except that the PTC layer did not contain the water-soluble polymer, and the content ratio between the acetylene black and the aqueous dispersion of a polyethylene particle was changed to 5:95 in terms of mass ratio based on the solid content.

Comparative Example 3

A laminated battery was produced in the same manner as in Example 1, except that a surfactant TRITON X (polyoxyethylene(10) octylphenyl ether, average molecular weight=646.85, Wako Pure Chemical Industries, Ltd.) was used instead of the sodium salt of carboxymethylcellulose as a water-soluble polymer, and that the thickness of the PTC layer was changed to 10 μm.

Comparative Example 4

A laminated battery was produced in the same manner as in Example 1, except that the PTC layer did not contain the aqueous dispersion of a polyethylene particle, and that the content ratio of the acetylene black to a water-soluble polymer, namely poly(acrylic acid) (trade name: PAA, produced by Wako Pure Chemical Industries, Ltd.) was changed to 30:70 in terms of mass ratio based on the solid content.

(Measurement of Weight Average Molecular Weight and Number Average Molecular Weight of Water-Soluble Polymer)

The weight average molecular weight and the number average molecular weight of a water-soluble polymer were determined from calibration curves obtained by gel permeation chromatography (GPC) using pullulan and polyethylene glycol as references. The calibration curves were obtained by approximation with cubic polynomials using pullulan and polyethylene glycol as references. In this regard, a sample for a GPC analysis was prepared as follows.

[Preparation of Sample for GPC Analysis]

Into a sample bottle, 4 mg of a sample was placed, to which 1 mL of ultrapure water was added. The mixture was left standing for 24 hours, and then shaken gently to dissolve the sample. Then after addition of 1 mL of the eluent specified below, the mixture was filtrated using a 0.45 μm-membrane filter and used as a sample for a GPC analysis.

[Conditions of GPC]

Apparatus: pump: LC-20AD, Shimadzu Corporation
 detector: RID-10A, Shimadzu Corporation
Column: TSKgel GMPW (trade name, Tosoh Corporation)+ASAHIPAK GF-7M HQ (trade name, Shimadzu GLC Ltd.); column size: 7.5 mm I.D.×300 mm
Eluent: 0.2 M NaCl aqueous solution/acetonitrile=9/1 (mass ratio)
Injection volume: 100 μL
Flow rate: 0.8 mL/min
Measurement temperature: 40° C.

(Evaluation of Battery Characteristics (Discharge Capacity and Discharge Rate Performance) and PTC Function)

With respect to the laminated batteries produced in Examples 1 to 7 and Comparative Examples 1 to 4, the discharge capacity and the discharge rate performance at 25° C. were measured using a charge and discharge tester (trade name: TOSCAT-3200, Toyo System Co., Ltd.) under the following charging and discharging conditions and used as representatives of battery characteristics.

(1) Discharge Capacity

After performing constant voltage and constant current (CCCV) battery charging at 4.2 V and 0.5 C, constant current (CC) discharging was performed at 0.5 C until 3 V, and the discharge capacity was evaluated according to the following evaluation criteria. In the above explanation, "C" means "current value (A)/battery capacity (Ah)".

A: 25 mAh or higher
B: 24 mAh or higher and less than 25 mAh
C: Less than 24mAh (2) Discharge Rate Performance Battery charging was performed under the same conditions as above, then the discharge capacity was measured by changing the discharge current value to 1 C, 3 C, and 5 C, and a value calculated by the following equation was deemed representative of discharge rate performance, which was evaluated according to the following evaluation criteria.

Discharge rate performance (%)=(discharge capacity at 5 C/discharge capacity at 0.5 C)×100

A: 90% or higher
B: 85% or higher and less than 90%
C: 80% or higher and less than 85%
D: Less than 80%

(3) PTC Function (Rate of Increase in Resistance)

Each of the laminated batteries produced in Examples 1 to 7 and Comparative Examples 1 to 4 was placed in a thermostatic chamber at 25° C., and the direct current resistance (DCR) of the laminated battery at 25° C. was measured and defined as the initial resistance. Next, the temperature of the thermostatic chamber was raised to 120° C., and kept at 120° C. for 15 min. Then, the laminated battery was taken out from the thermostatic chamber and cooled down to 25° C., and the direct current resistance (DCR) was measured and defined as the resistance after a battery temperature of 120° C. A rate of increase in resistance (%) was calculated by the following equation from the initial resistance and the resistance after a battery temperature of 120° C., and used as an index of a PTC function. The rate of increase in resistance was evaluated according to the following evaluation criteria. The results are shown in Table 1.

Rate of increase in resistance (%)=(resistance after a battery temperature of 120° C./initial resistance (25° C.))×100

In this regard, a direct current resistance (DCR) was calculated according to the following equation.

$$\text{Direct current resistance } (DCR) = \frac{(\Delta V_{1C} - V)(I_{1C} - I) + (\Delta V_{3C} - V)(I_{3C} - I) + (\Delta V_{5C} - V)(I_{5C} - I)}{(I_{1C} - I)^2 + (I_{3C} - I)^2 + (I_{5C} - I)^2} \quad [\text{Expression 1}]$$

Wherein, $I=(I_{1C}+I_{3C}+I_{5C})/3$, $V=(\Delta V_{1C}+\Delta V_{3C}+\Delta V_{5C})/3$, and $I_{1C}$, $I_{3C}$ and $I_{5C}$ are respectively corresponding discharge current values at 1 C, 3 C and 5 C, and $\Delta V_{1C}$, $\Delta V_{3C}$, and $\Delta V_{5C}$ are respectively voltage changes after 10 seconds from the initiation of discharge at the corresponding discharge current value.

A: 150% or higher
B: 130% or higher and less than 150%
C: 110% or higher and less than 130%
D: Less than 110%

In Table 1 to Table 3, "AB" represents acetylene black, "PE" represents polyethylene, "CMC" represents a sodium salt of carboxymethylcellulose, "PVP" represents poly(vinyl pyrrolidone), and "PAA" represents poly(acrylic acid). The respective numerals with respect to the respective components in the tables represent the relative contents of the respective components (by mass). "-" in the rows of composition of PTC layer means that the relevant component was not added. "-" in the row of thickness of PTC layer means that a PTC layer was not formed.

TABLE 1

| | | | Example | | | | | | | Comparative Example | | | |
|---|---|---|---|---|---|---|---|---|---|---|---|---|---|
| | | | 1 | 2 | 3 | 4 | 5 | 6 | 7 | 1 | 2 | 3 | 4 |
| Composition of PTC layer | Electrically conductive particle | AB (average particle diameter 48 nm) | 5 | 5 | 5 | 5 | 5 | 10 | 15 | — | 5 | 5 | 30 |
| | Polymer particle | PE (average particle diameter 0.6 μm) | 94 | 94 | 94 | 94 | 94 | 89 | 84 | — | 95 | 94 | — |
| | Water-soluble polymer | CMC | 1 | — | — | 1 | 1 | 1 | 1 | — | — | — | — |
| | | PVP | — | 1 | — | — | — | — | — | — | — | — | — |
| | | PAA | — | — | 1 | — | — | — | — | — | — | — | 70 |
| | Surfactant | Triton X | — | — | — | — | — | — | — | — | 1 | — |
| | Thickness of PTC layer (μm) | | 5 | 5 | 5 | 7 | 10 | 5 | 5 | — | * | 10 | 5 |
| Battery characteristics | Discharge capacity | | A | A | A | A | A | A | A | B | * | C | A |
| | Discharge rate performance | | A | A | A | B | C | A | A | C | * | D | B |
| PTC function | Rate of increase in resistance | | A | A | A | B | B | B | C | D | * | C | D |

* Formation of a PTC layer was difficult.

The battery characteristics of the batteries of Examples 1 to 7 were almost equivalent to or even better than those of Comparative Example 1 having no PTC layer. In this regard, the battery characteristics were improved further, when the thickness of a PTC layer was made thinner. The batteries of Examples 1 to 7 were superior in the rate of increase in resistance at 120° C. The temperature of 120° C., at which a remarkable increase in resistance was recognized with respect to the batteries of Examples 1 to 7, is a temperature lower than the shut-down temperature (135° C.) of a separator. This indicates that when heat is generated by overcharging, or the like in a battery according to the invention, the resistance increases to cut off the current so as to suppress heat generation even before the shut-down of the separator. The above substantiates that a battery according to the invention is superior in safety.

In contrast, in Comparative Example 2 where a water-soluble polymer was not contained, the electrically conductive particle and the polymer particle were not able to be dispersed in water, so that a PTC layer was not able to be formed. Further, in Comparative Example 3 where a surfactant was used instead of the water-soluble polymer (corresponding to an Example of JP-A No. 2009-176599), the battery characteristics were inadequate. According to additional studies by the inventors, with the composition of Comparative Example 3, it was difficult to form a thin film (less than 10 μm) of a PTC layer because electrically conductive particles were not dispersed thoroughly. In Comparative Example 4 where the polyethylene particle was not contained, although the battery characteristics were adequate, the rate of increase in resistance at 120° C. was insufficient, and a PTC function was lacking.

Example 8

(1) Production of Anode

First, 40 parts by mass of PIC (amorphous carbon, Kureha Corporation), 2.2 parts by mass of acetylene black (electroconductive material, trade name: HS-100, average particle diameter 48 nm (a value in a catalog of Denka Company Limited), Denka Company Limited), 28.92 parts by mass of a poly(vinylidene fluoride) solution (binder, trade name: KUREHA KF Polymer #1120, solid content 12 mass %, Kureha Corporation), and 26 parts by mass of N-methyl-2-pyrrolidone (NMP) were mixed to prepare an anode mixture paste. The anode mixture paste was coated on a 10 μm-thick copper foil (anode current collector), dried at 100° C. and then rolled to form an anode active material layer with a thickness of 62 μm, a coating amount of 60 g/m², and a mixture density of 0.97 g/cm³, thereby producing an anode.

(2) Production of Laminated Battery

The anode produced as above was cut into a 13.9 cm² rectangle to obtain an electrode for evaluation. A cathode identical with that used in Example 1 (a 13.5 cm² rectangle) was produced. The cathode, a separator made of a polyethylene porous sheet (trade name: HIPORE, thickness: 30 μm, Asahi Kasei Corporation), and the anode cut into a 13.9 cm² rectangle were layered in this order to prepare a laminate. The laminate was placed in an aluminum laminate container (trade name: ALUMINUM LAMINATE FILM, Dai Nippon Printing Co., Ltd.), and 1 mL of a nonaqueous electrolyte (trade name: SOL-RITE, a mixture solution of ethylene carbonate/methyl ethyl carbonate/dimethyl carbonate=2/2/3 (volume ratio) containing a 1 M LiPF$_6$, to which 0.8 mass % of vinylene carbonate was added with respect to the total amount of the mixture solution, Mitsubishi Chemical Corporation) was added thereto, and the aluminum laminate container was heat-sealed to produce a battery for evaluation of cycle performance.

Example 9

A battery for evaluation of cycle performance was produced in the same manner as in Example 8, except that a cathode identical with the cathode (a 13.5 cm² rectangle) used in Example 6 was produced.

Comparative Example 5

A laminated battery was produced in the same manner as in Example 8, except that the PTC layer was not provided on a surface of the cathode current collector.

(Evaluation of Adhesion Strength of PTC Layer)

Each PTC layer prepared in Examples 8 and 9 was cut into 10 mm×50 mm to prepare a specimen, on which a 180° peel strength was measured using a high precision universal testing machine (trade name: AGS-X, Shimadzu Corporation) at a peel rate of 100 mm/min, a measurement length of 25 mm, and a room temperature of 25° C., and defined as the adhesion strength of the PTC layer.

(Evaluation of Adhesion Strength of Cathode Active Material Layer)

Each cathode prepared in Examples 8 and 9, and Comparative Example 5 was cut into 10 mm×50 mm to prepare a specimen, on which a 180° peel strength was measured using a high precision universal testing machine (trade name: AGS-X, Shimadzu Corporation) at a peel rate of 100 mm/min, a measurement length of 25 mm, and a room temperature of 25° C., and defined as the adhesion strength of the cathode active material layer.

(Evaluation of Cycle Performance (Discharge Capacity Retention Rate after 50 Cycles))

(1) Discharge Capacity Retention Rate after 50 Cycles

The cycle lifetime at 25° C. of a laminated battery was measured using a charge and discharge tester (trade name: TOSCAT-3200, Toyo System Co., Ltd.) under the following charging and discharging conditions, and defined as a cycle lifetime characteristic. After performing constant voltage and constant current (CCCV) battery charging at 4.2 V and 1 C, constant current (CC) discharging was performed at 1 C until 2.7 V, and the value calculated by the following equation was evaluated as a discharge capacity retention rate after 50 cycles. The results are shown in Table 2.

Discharge capacity retention rate after 50 cycles (%)=(discharge capacity at 50th cycle/discharge capacity at 1st cycle)×100

TABLE 2

| | | | Example 8 | Example 9 | Comparative Example 5 |
|---|---|---|---|---|---|
| Composition of PTC layer | Electrically conductive particle | AB (average particle diameter 48 nm) | 5 | 10 | — |
| | Polymer particle | PE (average particle diameter 0.6 μm) | 94 | 89 | — |
| | Water-soluble polymer | CMC | 1 | 1 | — |
| | Thickness of PTC layer (μm) | | 5 | 5 | — |
| Adhesion strength | PTC layer (N/m) | | 64 | 64 | — |
| | Cathode active material layer (N/m) | | 40 | 40 | 33 |
| Cycle performance | Discharge capacity retention rate after 50 cycles (%) | | 91 | 92 | 80 |

Synthesis Example 1

Synthesis of Particle of Copolymer Containing (Meth)acrylate

Into a 0.5 liter three-neck flask equipped with a stirrer, a thermometer, a condenser, and a liquid feed pump, 335 g of water, and 21.46 g of a 2% aqueous solution of carboxymethylcellulose (trade name: CMC #2200, Daicel FineChem Ltd.) were added, and oxygen dissolved therein was removed by repeating 3 times an operation in which the inner pressure was reduced to 2.6 kPa (20 mmHg) using an aspirator and then returned to normal pressure with nitrogen. Keeping a nitrogen atmosphere inside the flask, and after heating the same in an oil bath at 60° C. with stirring, 0.26 g of potassium persulfate dissolved in 8 g of water was added into the three-neck flask.

Immediately after the addition of potassium persulfate, a mixture of 16.98 g of acrylonitrile (Wako Pure Chemical Industries, Ltd.), 68.26 g of butyl methacrylate (Wako Pure Chemical Industries, Ltd.), and 0.34 g of ethoxylated pentaerythritol tetraacrylate (trade name: ATM-4E, Shin-Nakamura Chemical Co., Ltd.) was dropped thereto using a liquid feed pump over 2 hours to perform polymerization. Stirring was continued for another 1 hour after the completion of dropping, and then the temperature was elevated to 80° C., and stirring was continued for another 2 hours, so that a particle of a copolymer containing (meth)acrylate (average particle diameter: 0.25 µm) was obtained.

Examples 10 to 18

The adhesion strength, battery characteristic, PTC function, and cycle performance were evaluated in the same manner as in Example 1 and Example 8, except that PTC layers with the compositions set forth in Table 3 were formed. The results are shown in Table 3.

In this regard, CHEMIPEARL® S100 and S300 in Table 3 are available from Mitsui Chemicals, Inc. CHEMIPEARL® S100 and S300 are ionomer resin particles.

Figure 3:
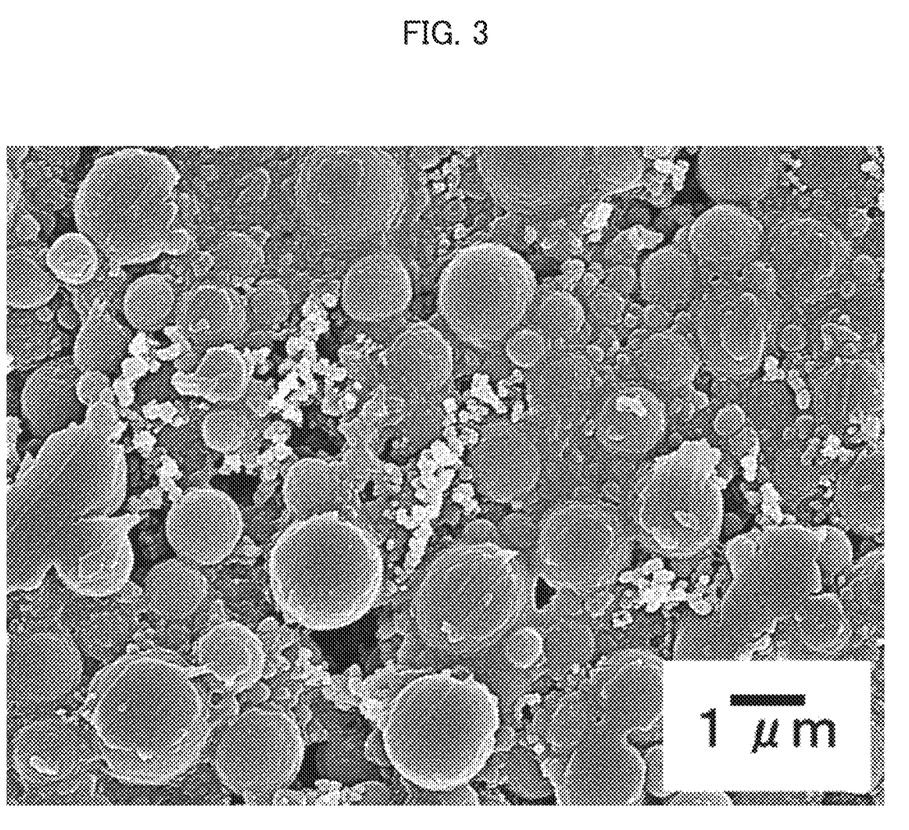
FIG. 3 is a scanning electron micrograph of a surface of a PTC layer obtained in Example 10.

FIG. 3 shows a scanning electron micrograph of a surface of the PTC layer obtained in Example 10.

With respect to the batteries of Examples 8 and 9, the discharge capacity retention rate after 50 cycles is improved remarkably compared to the battery of Comparative Example 5 not having a PTC layer, and the cycle performance is superior.

The adhesion strength of a PTC layer in Examples 10 to 18 is improved as the content ratio of an ionomer resin particle, or a particle of a copolymer containing (meth)acrylate in the PTC layer increases. This indicates that detachment of a PTC layer in coating a cathode active material layer on a PTC layer, or in assembling a battery can be suppressed.

The cycle performance in Examples 10 to 18 is improved as the content ratio of a copolymer containing (meth)acrylate increases. This indicates that a battery with a longer operating life is obtainable.

Further, it is obvious that Examples 10 to 18 are also superior in terms of PTC function.

Meanwhile, the entire contents of the disclosures of Japanese Patent Application No. 2013-205516 are incorporated herein by reference. Further, all the literature, patent application, and technical standards cited herein are also herein incorporated to the same extent as provided for specifically and severally with respect to an individual literature, patent application, and technical standard to the effect that the same should be so incorporated by reference.

REFERENCE SIGNS LIST

1 Lithium ion secondary battery
2 Cathode plate
3 Anode plate
4 Separator
5 Electrode group
6 Battery container

TABLE 3

| | | | Example | | | | | | | | |
|---|---|---|---|---|---|---|---|---|---|---|---|
| | | | 10 | 11 | 12 | 13 | 14 | 15 | 16 | 17 | 18 |
| Composition of PTC layer | Electrically conductive particle | AB (average particle diameter 48 nm) | 10 | 10 | 10 | 10 | 10 | 10 | 10 | 10 | 10 |
| | Polymer particle | PE (average particle diameter 0.6 µm) | 84 | 79 | 69 | 84 | 79 | 69 | 84 | 79 | 69 |
| | | CHEMIPEARL S300 (average particle diameter 0.5 µm) | 5 | 10 | 20 | — | — | — | — | — | — |
| | | CHEMIPEARL S100 (average particle diameter 0.1 µm) | — | — | — | 5 | 10 | 20 | — | — | — |
| | | Synthesis example 1 (average particle diameter 0.25 µm) | — | — | — | — | — | — | 5 | 10 | 20 |
| | Water-soluble polymer | CMC | 1 | 1 | 1 | 1 | 1 | 1 | 1 | 1 | 1 |
| | Thickness of PTC layer (µm) | | 5 | 5 | 5 | 5 | 5 | 5 | 5 | 5 | 5 |
| Adhesion strength | PTC layer (N/m) | | 133 | 140 | 145 | 136 | 143 | 158 | 110 | 115 | 128 |
| | Cathode active material layer (N/m) | | 43 | 45 | 48 | 44 | 47 | 49 | 41 | 42 | 43 |
| Battery characteristic | Discharge capacity | | A | A | B | A | A | B | A | A | B |
| | Discharge rate performance | | A | A | B | A | B | B | A | A | A |
| PTC function | Rate of increase in resistance | | A | A | A | A | A | A | A | A | A |
| Cycle performance | Discharge capacity retention rate after 50 cycles (%) | | 93 | 94 | 95 | 94 | 95 | 95 | 93 | 94 | 95 |

The invention claimed is:

1. A cathode for a lithium ion secondary battery, comprising:
    a cathode current collector;
    a PTC layer provided on the cathode current collector, the PTC layer comprising electrically conductive particles, polymer particles, and a water-soluble polymer comprising at least one selected from the group consisting of a carboxymethyl cellulose derivative, polyvinyl pyrrolidone, and polyacrylic acid, wherein the polymer particles are different from the water-soluble polymer and wherein the polymer particles comprise particles of an ionomer resin; and
    a cathode active material layer provided on the PTC layer.

2. The cathode for a lithium ion secondary battery according to claim 1, wherein the PTC layer has a thickness of from 1 µm to 10 µm.

3. The cathode for a lithium ion secondary battery according to claim 1, wherein a mass ratio of a total amount of the electrically conductive particles and the polymer particles which are comprised in the PTC layer to the water-soluble polymer comprised in the PTC layer (a total amount of the electrically conductive particles and the polymer particles: the water-soluble polymer) is from 99.9:0.1 to 95:5.

4. The cathode for a lithium ion secondary battery according to claim 1, wherein the polymer particles have an average particle diameter of from 0.1 µm to 5 µm.

5. The cathode for a lithium ion secondary battery according to claim 1, wherein the electrically conductive particles comprise at least one selected from the group consisting of carbon particles and metal particles.

6. The cathode for a lithium ion secondary battery according to claim 1, wherein the polymer particles comprise the particles of the ionomer resin and particles of a (meth) acrylate-containing copolymer.

7. The cathode for a lithium ion secondary battery according to claim 1, wherein the content ratio of the electrically conductive particles to the polymer particles in mass ratio is from 2:98 to 20:80.

8. A lithium ion secondary battery, comprising the cathode for a lithium ion secondary battery according to claim 1.

9. The cathode for a lithium ion secondary battery according to claim 1, wherein the PTC layer is an aggregate of the electrically conductive particles, the polymer particles, and the water-soluble polymer.

10. The cathode for a lithium ion secondary battery according to claim 9, wherein the polymer particles comprise non-electroconductive particulates.

11. The cathode for a lithium ion secondary battery according to claim 9, wherein the polymer particles comprise polyolefin particles and the particles of the ionomer resin.

12. The cathode for a lithium ion secondary battery according to claim 1, wherein the polymer particles comprise non-electroconductive particulates.

13. The cathode for a lithium ion secondary battery according to claim 1, wherein the polymer particles comprise polyolefin particles and the particles of the ionomer resin.

* * * * *